Nov. 3, 1959 — J. C. WINSLOW — 2,910,895
POWER TOOL WITH SUCTION FOOT
Filed Dec. 13, 1957 — 7 Sheets-Sheet 1

INVENTOR.
JAMES C. WINSLOW
BY
ATTORNEY

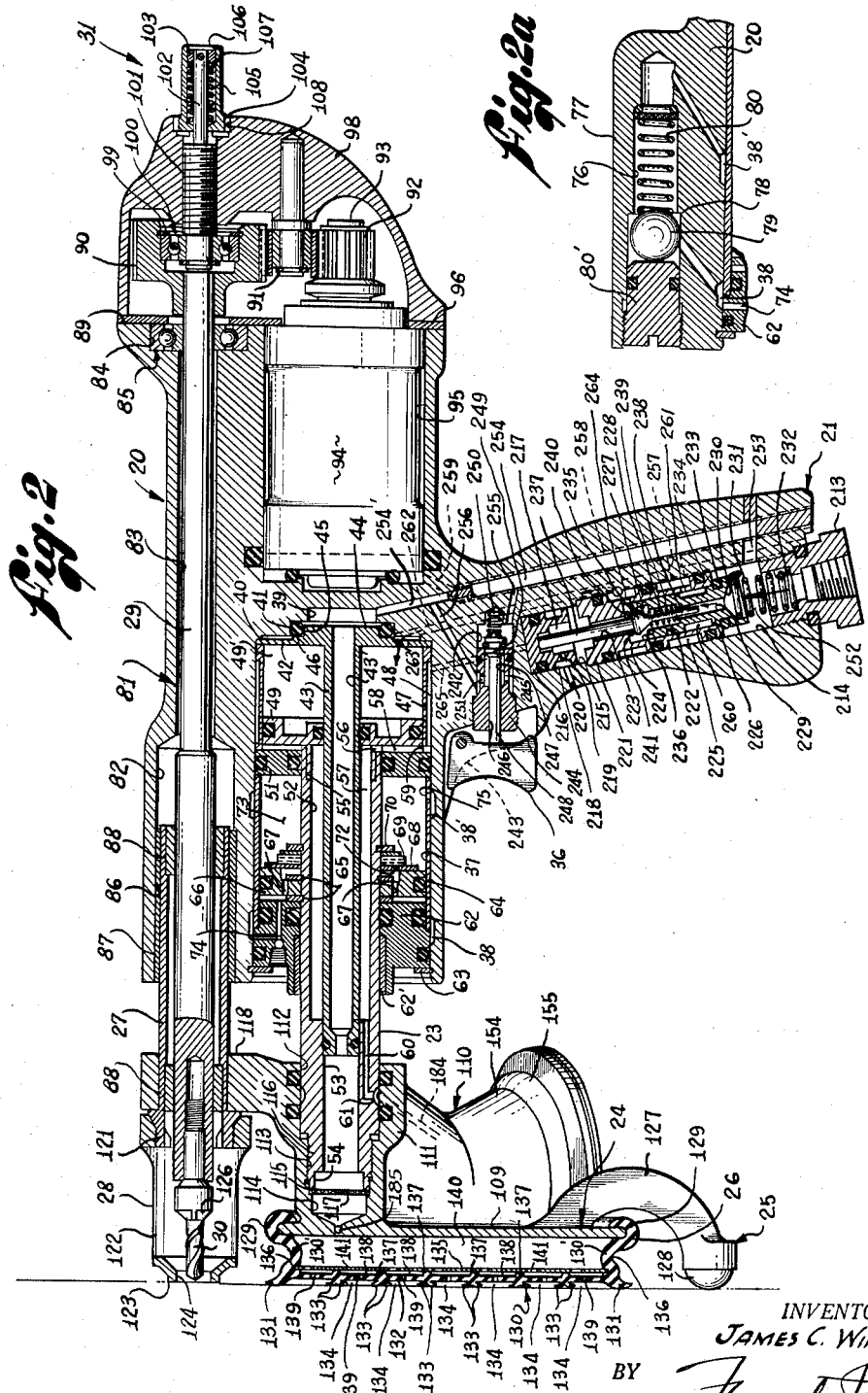
Nov. 3, 1959  J. C. WINSLOW  2,910,895
POWER TOOL WITH SUCTION FOOT
Filed Dec. 13, 1957  7 Sheets-Sheet 2
INVENTOR.
JAMES C. WINSLOW
BY
ATTORNEY Nov. 3, 1959 J. C. WINSLOW 2,910,895
POWER TOOL WITH SUCTION FOOT
Filed Dec. 13, 1957 7 Sheets-Sheet 3
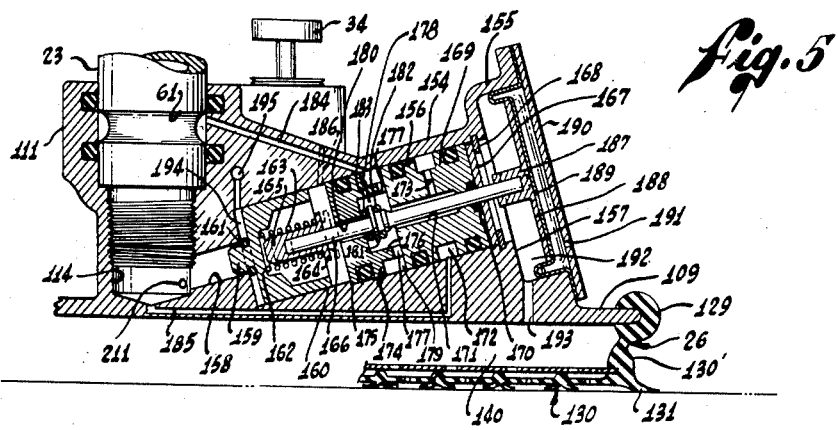
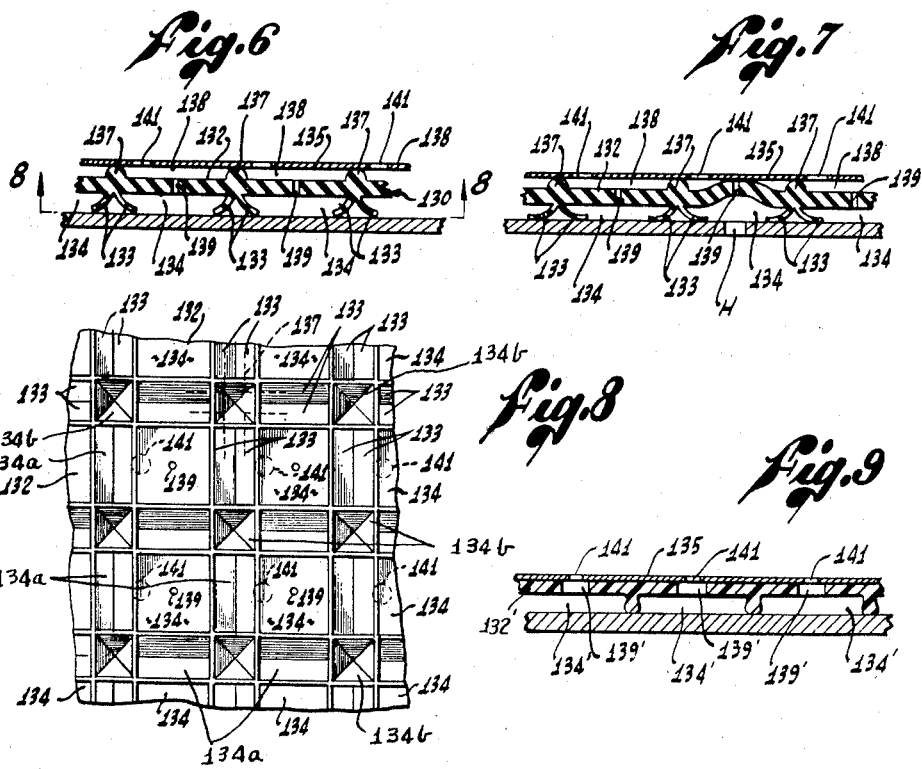
INVENTOR.
JAMES C. WINSLOW
BY
ATTORNEY Nov. 3, 1959
J. C. WINSLOW
2,910,895
POWER TOOL WITH SUCTION FOOT
Filed Dec. 13, 1957
7 Sheets-Sheet 4
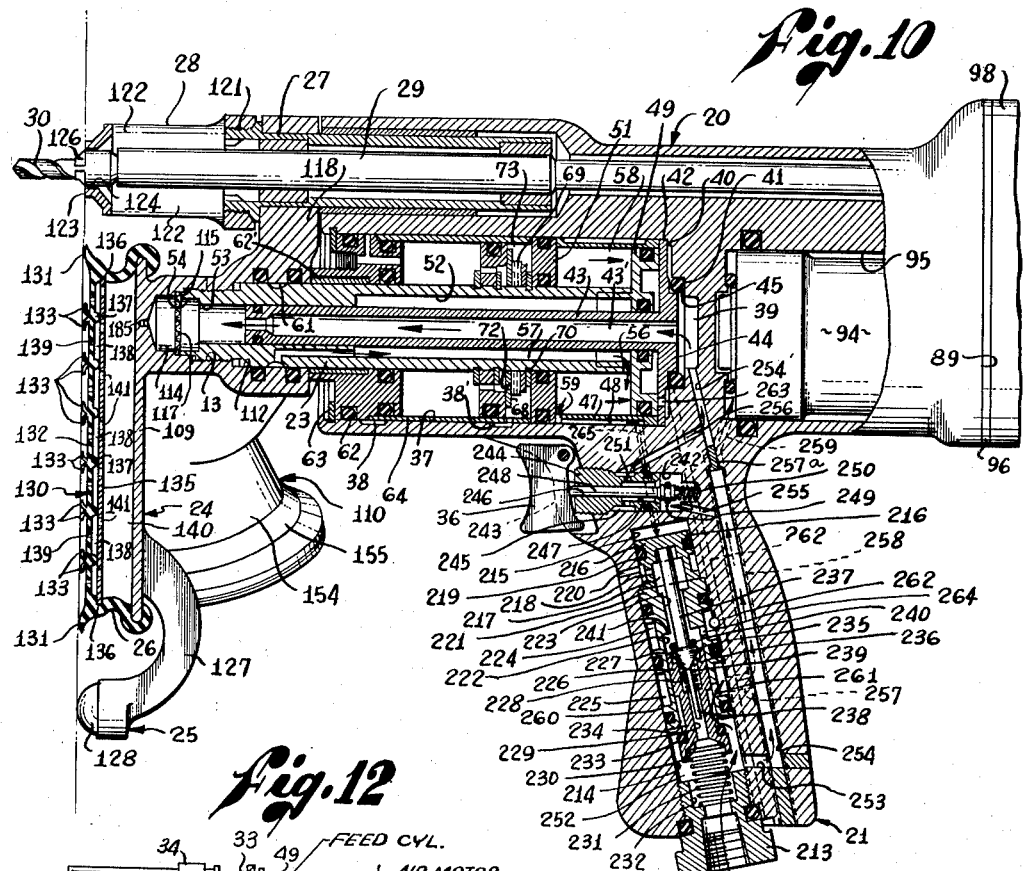
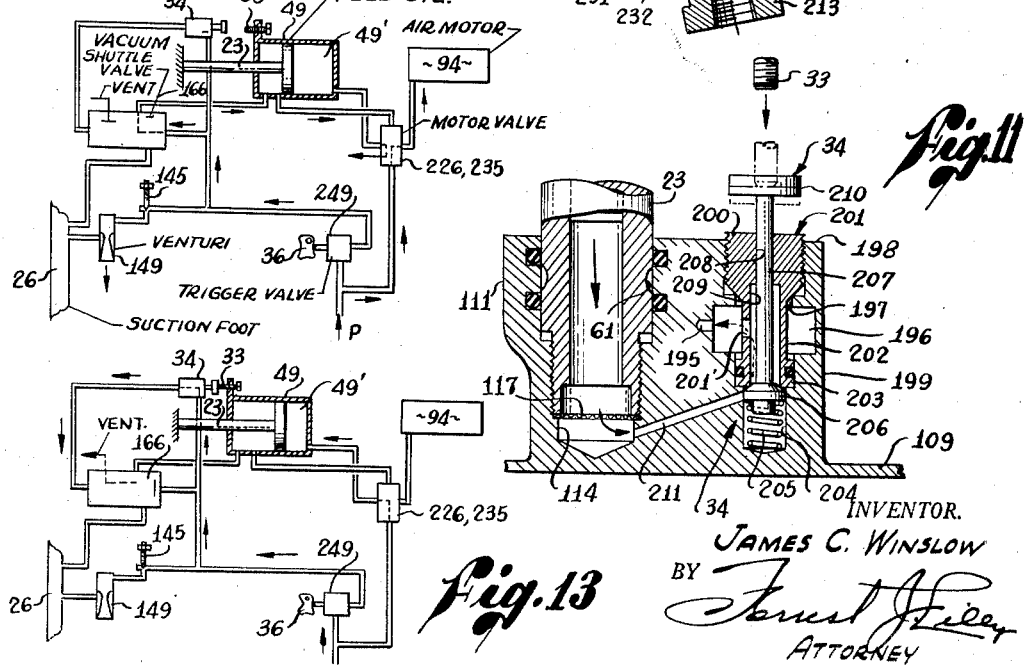
INVENTOR.
JAMES C. WINSLOW
BY
ATTORNEY

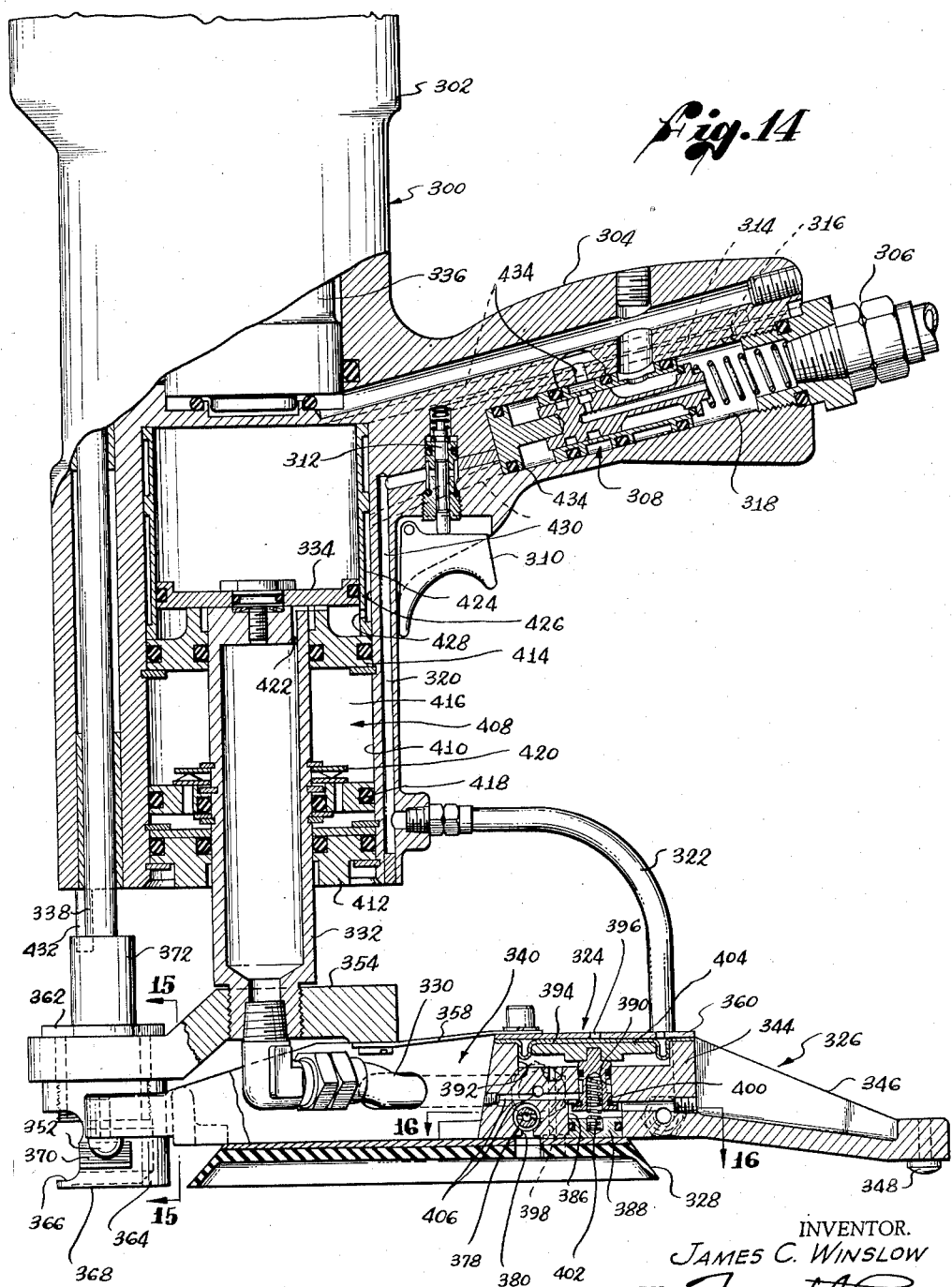

Nov. 3, 1959
J. C. WINSLOW
2,910,895
POWER TOOL WITH SUCTION FOOT
Filed Dec. 13, 1957
7 Sheets-Sheet 6
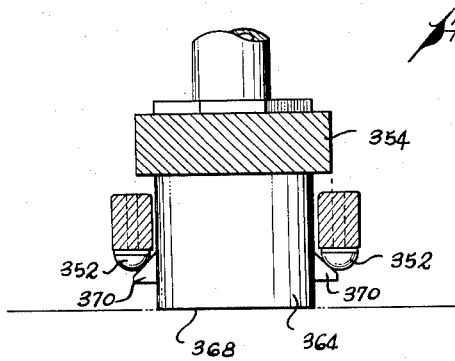
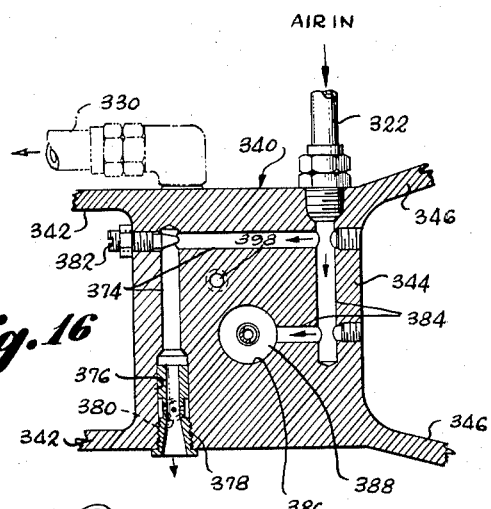
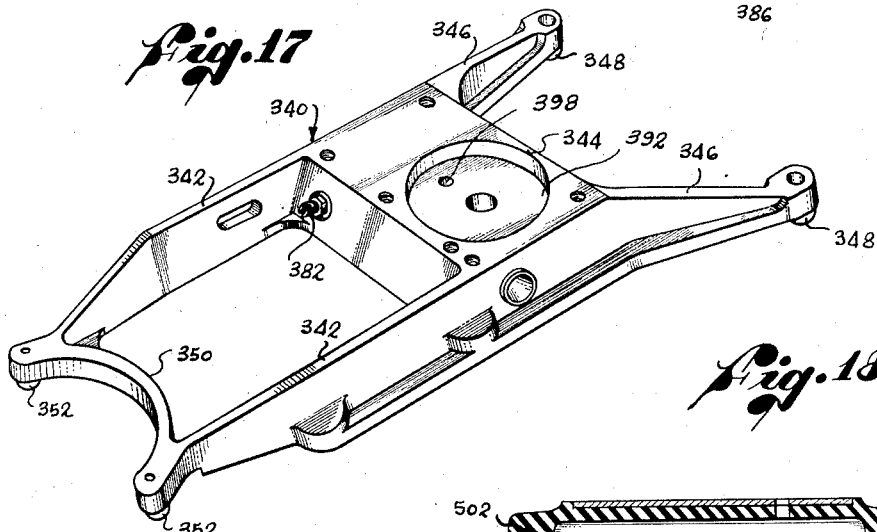
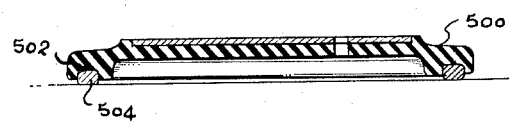
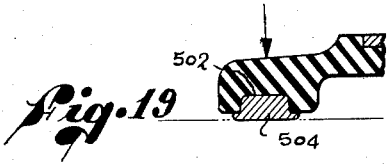
INVENTOR.
JAMES C. WINSLOW
BY
Attorney Nov. 3, 1959 — J. C. WINSLOW — 2,910,895
POWER TOOL WITH SUCTION FOOT
Filed Dec. 13, 1957 — 7 Sheets-Sheet 7

INVENTOR.
JAMES C. WINSLOW
BY
Attorney

United States Patent Office 2,910,895
Patented Nov. 3, 1959

2,910,895

POWER TOOL WITH SUCTION FOOT

James C. Winslow, Sierra Madre, Calif.

Application December 13, 1957, Serial No. 703,237

24 Claims. (Cl. 77—13)

This invention relates generally to work holders, and more particularly a suction grip work holder for power tools and the like.

This application is a continuation-in-part of my co-pending application, Serial No. 586,189, filed May 21, 1956, and entitled Pneumatic Power Drill With Suction Foot (now abandoned).

The invention has primary utility on pneumatic power tools for working on aircraft structures and will be described in that connection. It will become readily apparent as the description proceeds, however, that the invention is capable of a wide variety of other applications and uses.

Present-day aircraft construction techniques require relatively precision drilling, countersinking, rivet shaving and other similar operations to be performed on aircraft structures. Precision operations of this character necessitate accurate retention of the tool bit axis in fixed relationship with respect to the structure being worked on.

Portable power tools have, in the past, been employed for performing precision operations of this nature. In such cases, however, jigs or other rigid supports were generally required to firmly hold the tools in fixed relationship relative to the structure. These jigs were space consuming, difficult to move about, and costly to manufacture.

Moveover, jigs for this purpose were often prone to slight deflection under the pressure of the tool bit on the work. Such deflections, of course, produced inconsistent results in the drilling or other operations being performed.

In most drilling, rivet shaving and countersinking operations on aircraft structures, it is essential that the axis of the tool bit be accurately perpendicular to the surface being worked on. Where jig-supported power tools were employed, it was exceedingly difficult, if not impossible, to accurately position the tool axis normal to the work surface, especially if the surface was not flat as in the case of most aircraft skins.

A broad object of the present invention is the provision of a work holder for power tools and the like which avoids the foregoing and other deficiencies of existing work holders.

A more specific object of the invention is the provision of a suction grip work holder for clamping power tools and the like to the surface of a workpiece.

Another object of the invention is the provision of a suction grip work holder of the character described which is capable of adhering to uneven or perforated work surfaces.

Still another object is the provision of a work holder of the character described which is especially designed for clamping to concrete, brick, and other similar surfaces.

Yet another object is the provision of a portable power tool embodying a suction grip work holder of the character described.

A further object is the provision of a portable power tool and suction grip work holder combination of the character described wherein relative advancing of the tool bit toward the work and driving of the tool bit occur automatically in response to firm clamping of the tool to the work.

Yet a further object is the provision of a portable power tool and suction grip work holder combination of the character described which is capable of accurately holding the axis of the tool bit in predetermined angular relationship to the work surface.

A still further object is the provision of a portable power tool and suction grip work holder combination of the character described which is effective to accurately position the tool bit normal to a localized area of a work surface even though the surrounding surface, which is engaged by the suction grip work holder, is inclined to said localized surface area.

Numerous other objects, advantages and features of the invention will become readily apparent as the description proceeds.

Briefly, the foregoing and other objects are attained by the provision of a hollow suction foot to be attached to the forward end of a portable power tool or the like. This suction foot has an open forward side bounded by flexible sealing lips engageable with the surface of a workpiece.

Manually controllable means are provided for evacuating this foot to cause clamping of the latter, and the portable power tool or other device attached thereto, to the work surface. In the illustrative embodiments of the invention, the suction foot is mounted on a portable pneumatic tool, and an aspirator, operated by the air supplied to the tool, is used to evacuate the foot.

Each operating cycle of the illustrative tools, involving sequential evacuation of the suction foot, driving of the tool bit, relative advancing of the bit toward the work, and finally relative retraction of the bit away from the work, is automatic in response to manual actuation of a trigger. Driving of the tool bit and relative advancing of the latter toward the work, however, do not occur until the foot is firmly clamped to the work.

In order to enable clamping of the foot to a perforated surface, the foot is of compartmented construction and embodies means for sealing off a compartment which cannot be evacuated, owing to its overlying a hole in the work.

The invention also discloses a suction foot which is especially designed for working on rough surfaces such as concrete and brick walls, as well as a foot which is uniquely adapted to aircraft rivet shaving applications.

In one form of the invention, relative advancing and retraction of the tool bit is accomplished by fluid operated piston means.

A better understanding of the invention may be had from the following detailed description thereof taken in connection with the annexed drawings, wherein:

Fig. 2 is an enlarged section taken along line 2—2 of Fig. 1;

Fig. 2a is an enlarged section taken along line 2a—2a of Fig. 1;

Fig. 5 is an enlarged section taken along line 5—5 of Fig. 3;

Fig. 6 is a detail view, in section, illustrating the suction foot in its inoperative condition;

Fig. 7 is a view similar to Fig. 6 illustrating the suction foot as it appears when clamped to an apertured work surface;

Fig. 8 is a view looking in the direction indicated by the arrows on line 8—8 of Fig. 6;

Fig. 9 is a view similar to Fig. 6 illustrating a modified suction foot construction.

Fig. 10 is a view generally similar to Fig. 2 but showing the parts of the drill as they appear when the drill actuating trigger is depressed during a drilling cycle, the drill bit being shown as advanced to its maximum depth in a workpiece;

Fig. 11 is an enlarged section taken along line 11—11 of Fig. 3;

Fig. 12 is a diagrammatic showing of the pneumatic system embodied in the illustrative drill, the arrows indicating the directions of air flow during advancing of the drill bit through a workpiece;

Fig. 13 is a diagrammatic showing similar to Fig. 12 but wherein the arrows indicate the direction of air flow during retraction of the drill bit from a workpiece;

Fig. 14 is a section through a modified form of the present tool;

Fig. 15 is an enlarged section taken along line 15—15 of Fig. 14;

Fig. 16 is a section taken along line 16—16 of Fig. 14;

Fig. 17 is a view in perspective of a frame embodied in the modified suction foot on the tool of Fig. 14;

Figs. 18 and 19 illustrate a further modified suction foot for use on rough work surfaces;

Figures 1, 3, 4:
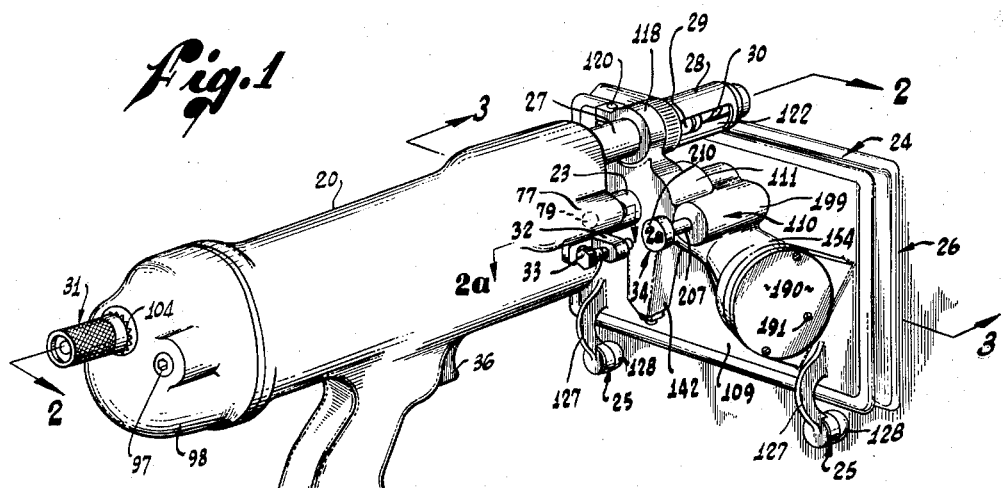
Fig. 1 is a perspective view of a pneumatic power drill embodying the invention, the parts thereof being shown in their normal inoperative positions.
Fig. 3 is an enlarged section taken along line 3—3 of Fig. 1.
Fig. 4 is an enlarged section taken along line 4—4 of Fig. 3, illustrating the suction foot of this invention in clamping engagement with a workpiece.

Referring first to Fig. 1 of the drawings, the illustrative power drill comprises, generally, an elongated, substantially cylindrical drill body 20 formed with a pistol-grip handle 21 leading into the butt end of which is a flexible hose 22 for conveying pressurized air from a supply, not shown, to the working parts of the drill.

Extending from the forward end of drill body 20, in parallel relation to but displaced somewhat below the longitudinal axis of the body, is a ram 23 which, as will be presently seen, is mounted in the drill body for axial movement between an extended position (Figs. 1 and 2) and a retracted position (Fig. 10). Fixedly carried at the free end of the ram is a work engaging head 24 including a pair of work engaging members 25 and a suction foot 26 for clamping to the surface of the work. Indicated at 27 is a sleeve which is slideably mounted in drill body 20 in spaced parallel relation to ram 23 and is fixed to head 24 for simultaneous extensile and retractile movement of the sleeve and ram.

Rotatably mounted in the drill body 20 and rotatably and slideably extending through and beyond the end of sleeve 27 and into a drill bushing 28, fixed to the end of the sleeve, is a drill spindle 29 carrying a drill bit 30. Drill spindle 29 is adapted to be axially adjusted in the body by manipulation of spindle adjusting means 31 at the rear of the drill body, as will presently be seen.

Adjustably mounted in a lateral extension 32 at the forward end of the drill body is a stop 33 engageable, in the retracted position of work engaging head 24, with pilot valve means 34 for limiting movement of the head toward the drill body 20 and for initiating automatic return of the head to its extended position.

Handle 21 mounts an actuating trigger 36 for controlling the operation of the drill, which operation is briefly as follows. Assuming the parts of the drill to be in their normal inoperative position, illustrated in Fig. 1, the work engaging head 24 is brought to bear against the surface of a workpiece, not shown, the members 25 and the end of drill guide, cage, or bushing 28 forming a three point work engaging support for maintaining the axis of drill spindle 29 in a predetermined angular relationship with the work.

Actuation of trigger 36 results first in the creation of a vacuum in the suction foot 26 to cause the latter to clamp to the surface of the workpiece and subsequently in the rotation of drill spindle 29 and relative retraction of the work engaging head 24 toward the drill body 20. As previously indicated, if the work is a free piece, the head, together with the work, is drawn toward the drill tool body which is held stationary by the operator, while if the work is a stationary structural member, the drill tool body is advanced toward the head, the latter remaining stationary.

In either event, the relative retraction of the head toward the drill tool body causes the drill bit 30 to move, relative to the drill bushing 28, from a retracted position within the bushing, illustrated in Fig. 1, to a position of extension through the end of the bushing (Fig. 10) with a resultant advancing of the drill bit through the work.

Engagement of stop 33 with pilot valve means 34 automatically causes return of work engaging head 24 to its extended position of Fig. 1 and withdrawal of the drill bit from the work, the suction foot remaining clamped to the work until trigger 36 is released. Subsequent actuation of trigger 36 results in repetition of the above-described drilling cycle. The operation of the present power drill will be subsequently described in greater detail.

Referring now to Figs. 2–8, a large bore 37 extends into the forward end of drill body 20, the wall of which bore is circumferentially grooved at 38 and 38'. Bore 37 is bored at its inner end or reduced diameters to form a recess 39, an annular ledge 40, and an annular seat 41.

Fitted in the inner end of large bore 37 and abutting at its periphery the annular ledge 40 is a disk-like head 42 rigid on one end of a hollow cylindrical stem 43 having an axial passage 43' opening through head 42 into recess 39. The other end of stem 43 extends coaxially through bore 37 and terminates somewhat beyond the open end thereof, as shown. The forward end of the passage 43' through the stem is constricted, as shown.

Disk like head 42 includes a central hub 44 received in and radially spaced from the cylindrical wall of annular seat 41. An O-ring 45 serves to seal the hub to this latter wall, the O-ring bearing against an annular raised portion 46 of the head about the hub.

Received in the inner end of the bore 37 and having its inner end abutting head 42 is a first liner barrel 47 which is externally peripherally grooved at 48. Slideably received in this barrel is a piston 49 carried on the inner end of ram 23 (Fig. 1) and sealed to the liner barrel 47 by an O-ring, as shown. The piston 49, in the aforementioned retracted position of the ram, abuts disk head 42. When the ram is in its aforementioned extended position, shown in Fig. 2, piston 49 is slightly spaced from an annular abutment disk 51 which abuts the outer end of liner barrel 47 and which is centrally bored to slidably receive the ram. O-rings seal the abutment disk to the wall of bore 37 and to the ram 23, as shown.

Ram 23 has a bore 52 extending into its inner end which bore is continued at its forward end by a reduced diameter bore 53 which, in turn, is continued by an enlarged diameter bore 54 opening through the forward end of the ram. Piston 49 is formed with a cylindrical hub 55 which is fixed in the inner end of the bore 52 in ram 23 for securing the piston to the latter. A central bore through the piston slideably receives stem 43, the latter extending forwardly through the ram and having its forward end slideably received in reduced bore 53 thereof. O-rings seal the stem to the ram and piston, as shown.

The wall of ram 23, adjacent piston 49, is ported at 56 to communicate the after end of the annular space 57 between the stem 43 and ram with the space 58 between the piston 49 and disk 51. Liner barrel 47 is ported at 59 adjacent abutment disk 51 to communicate space 58 with the peripheral groove 48 in the liner barrel. Ram 23 is formed with a forward passage 60 communicating an exterior peripheral groove 61 on the forward end of the ram with the forward end of annular space 57.

Closing the forward end of bore 37 and having an axial bore slideably receiving the ram and a counterbore fitted with a sleeve bearing 62' is a closure disk 62 which is retained in position in the bore by abutment of its forward face with a snap ring 63 and its after face with the forward end of a second liner barrel 64, said after face of closure disk 62 being formed with a reduced diameter portion fitted in the forward end of liner barrel 64, as shown. The after end of liner barrel 64 abuts disk 51, as illustrated. Closure disk 62 is sealed to the wall of bore 37, second liner barel 64, and ram 23 by the O-rings illustrated.

Mounted tightly on ram 23 between closure disk 62 and abutment disk 51, and retained in axial position on the ram by snap rings 65, is a disk 66 which is slideably fitted for longitudinal movement in second liner barrel 64 and sealed to the latter by an O-ring, as illustrated. Oil holes 67 extend through this disk. A thin, flat check valve disk 68 is pressed against the rear face of disk 66 by a spider 69 backed up by a snap ring 70 mounted in a groove in the ram. A small oil check orifice 72 is formed in disk 68. The chamber 73 in liner barrel 64 between closure disk 62 and abutment disk 51, on both sides of disk 66, is filled with oil so that longitudinal movement to the right of disk 66 in chamber 73, and hence retractile movement of ram 23 is checked by the restricted oil flow through orifice 72. In the reverse direction of travel of these parts, the valve disk 68 can separate slightly from disk 66, against the resiliency of spider 69, to permit relatively unrestricted oil flow across the disk 66 through oil holes 67.

Disk 66 and its associated parts 68—70 thus, in effect, form a spring controlled check valve for permitting relatively free extensible movement of ram 23 and causing restricted retractile movement of the ram.

Provision is made for maintaining chamber 73 constantly full of oil and for adjusting the damping imposed on retractile movement of the ram. For this purpose, closure disk 62 is formed with a passage 74 communicating chamber 73, at the forward side of disk 66, with groove 38 in the wall of bore 37, and liner 64 is ported at 75 to communicate chamber 73, at the after side of disk 66, with groove 38'.

As shown in Fig. 2a, grooves 38 and 38' are communicated to opposite ends of a reservoir chamber 76, formed in a protuberance 77 (Fig. 1), of the drill body 20. Chamber 76 is formed with a valve seat 78 against which is adapted to seat a ball check valve 79 biased away from seat 78 by a spring 80. An adjustable stop 80' limits maximum separation of ball 79 and its seat 78.

Body 20 of the drill is formed with a longitudinal opening 81 for receiving the drill spindle 29, which opening is spaced above bore 37. Opening 81 comprises a forward enlarged bore 82 which extends into the forward end of the drill body 20 and is continued at its after end in a reduced diameter bore 83 which opens through the after end of the drill body and is counterbored at 84 for receiving the outer race of a ballbearing assembly 85 rotatably mounting the after end of the drill spindle in the drill body.

Bore 82 is counterbored at 86 for receiving a sleeve bearing 87 in which is slideably fitted the sleeve 27 (Fig. 1). Sleeve 27 is counterbored at its opposite ends to receive sleeve bearings 88 for journalling the forward end of the drill spindle.

The after end of the drill spindle extends a distance beyond the after end face 89 of the drill body and fixedly mounts a pinion 90 which meshes with an idler gear 91 which, in turn, meshes with a gear 92 fixed on the drive shaft 93 of an air motor 94. Air motor 94 is fitted within a large bore 95 extending into the drill body and opening through end face 89.

Flatly engaging end face 89 and having openings through which the drill spindle and a reduced portion of the air motor casing extend, as shown, is a gasket 96. Fixed to the drill body as by screws 97 (Fig. 1), and bearing against gasket 96 is a hollow end cover 98 rotatably mounting idler gear 91 and enclosing the above-mentioned pinion and gears. Axial and radial clearance is provided between the pinion 90 and the cover 98 to permit limited axial movement of the drill spindle 29 and pinion 90 fixed on the spindle, as will now be seen.

Pinion 90 is axially recessed and counterbored inwardly from its after end, as shown, and fitted in such counterbore, and retained therein by a snap ring 99 is the outer race of a ballbearing assembly 100, the inner race of which is fixed against axial movement on the end of an adjusting screw 101 threaded to cover 98.

Adjusting screw 101 is formed with a stem 102 extending rearwardly beyond the cover, and fixed to the rearward extremity of the stem is a hexagonal member 103. A serrated disk 104 surrounds stem 102 and is slideable thereon. Integrally formed on this disk 104 is a rearwardly extending, knurled sleeve 105 having a hexagonal opening 106 which slideably receives hexagonal member 103. A compression spring 107 surrounds stem 102 and bears at opposite ends against member 103 and disk 104 for urging the latter against the bottom of a recess 108 in the cover 98. The wall of this recess is serrated, for meshing engagement with the serrations on disk 104, so as to normally prevent rotation of knurled sleeve 105 relative to the drill body and cover 98. The sleeve 105 is knurled so that it may be gripped and readily manipulated by the fingers of the operator. To adjust the spindle axially, sleeve 105 is pulled rearwardly to disengage disk 104 from serrated opening 108, then turned to rotate adjustment screw 101 which, moving axially, moves bearing 100 and pinion 90 to axially shift spindle 29. Sleeve 105 is then released and reengages serrated opening 108 by action of spring 107. The above-described structure constitutes the spindle adjusting means 31 (Fig. 1).

For the purpose of precision adjustment of the longitudinal position of the drill spindle, the sleeve 105 may be drawn rearwardly against the pressure of spring 107 until the serrations on disk 104 clear those on the cover 98 whereupon rotation of sleeve 105 will rotate stem 102 and adjusting screw 101 to adjustably position the pinion 90 and, accordingly, the drill spindle 29, which is fixed to the pinion, longitudinally of the drill body.

Work engaging head 24 comprises a one-piece casting including a flat, rectangular plate portion 109 having upstanding therefrom structure generally indicated at 110. This structure comprises a projection 111 which is bored inwardly from its rear face at 112, which bore 112 is continued at its forward end by a reduced, threaded bore 113 which, in turn, is continued by a still further reduced bore 114, the latter being counterbored to form an annular seat 115. The forward end portion of ram 23 is received in bore 112, the ram having a reduced, threaded extension 116 threadedly engaged in threaded bore 113. A disk-shaped filter screen 117 is clamped between the end of the ram and annular seat 115, as shown. A pair of O-rings are disposed in circumferential grooves in the wall of bore 112, at opposite sides of peripheral groove 61 in the ram.

Projection 111 has a lateral extension 118 which is bored to receive sleeve 27, the extension being slotted, as shown, at 119 (Fig. 3), and a screw 120 is threaded in the furcations for rigidly clamping extension 118 to sleeve 27. The forward end of sleeve 27 is enlarged and threaded at 121 for threaded engagement in the rear end of the cylindrical drill bushing 28 whose wall is cut away, as shown at 122, to prevent accumulation of chips.

The forward end of the drill bushing 28 is flat to form a face 123 and is substantially tapered and formed with a bore 124 through which drill bit 30, removably fixed in the end of the drill spindle 29, is adapted to extend when the work engaging head is retracted toward the drill body, as will be seen. The drill bit may, if desired, be formed with a countersink 126.

Work engaging members 25 comprise arcuate legs 127 carried on the rear surface of plate 109 which extend rearwardly and downwardly beyond the normally lower edge of the plate and then forwardly, terminating at their forward ends in spherical work engaging feet 128. Feet 128 are tangent to the plane of the forward end face 123 of the drill bushing, the latter and said feet 128 forming a three point work engaging support for retaining the drill spindle normal to the surface of the work.

Fixedly carried by plate 109, as by being formed with a bead 129 which is slotted to receive the edge of the plate, is a rectangular casing 130, of rubber or other resilient material, comprising a compartmented suction foot 26.

This casing comprises four side walls 130', arranged to form a rectangular enclosure, and along one edge of which the beads 129 are formed. The opposite or forward edges of the side walls 130' are tapered to form relatively flexible lips 131 for bearing against and sealing to the surface of the work.

Spanning the four side walls inwardly of the lips 131 is a flexible wall or diaphragm 132 from the forward surface of which project a plurality of flexible, intersecting walls 133 (Figs. 6–8), defining a series of main hollow compartments or suction cups 134 arranged in checkerboard fashion and each having the general shape of a truncated pyramid. Also defined by the walls 133, at the four sides of each of the suction cups 134 are rectangular, secondary compartments or suction cups 134a, and at the corners of the square enclosures, smaller, secondary square compartments or suction cups 134b. The forward ends of the suction cups are open, as shown. The forward edges of the lips 131 and walls 133 are disposed in a common plane spaced slightly forwardly of the aforementioned plane of the feet 128 and forward end face 123 of the drill bushing so that when the work engaging member 24 is engaged with a workpiece, the lips 131 and walls 133 will be slightly flexed in the manner shown in Fig. 6.

Disposed behind and in slightly spaced parallel relationship to flexible diaphragm 132 is a relatively stiff plate 135 which is retained in position by having its edges received in grooves 136 in side walls 130' of the casing 130. The rear surface of the wall 132 is formed with intersecting ribs 137 forming a series of squares aligned with the main hollow suction cups 134. These ribs bear against plate 135 to retain a spacing between the latter and wall 132 with the resultant formation of a plurality of rectangular spaces 138.

Extending through wall 132 and centrally communicating each space 138 with the interior of its aligned main suction cup 134 are a plurality of orifices 139, and extending through plate 135 and communicating each space 138 with the interior 140 of the suction foot behind the plate are a plurality of holes 141 which are offset toward the ribs 137, as shown. Holes 141 are substantially larger than orifices 139.

During operation of the drill, the suction foot is engaged with a workpiece and a vacuum is produced in the interior 140 of the suction foot and hence in the several main suction cups 134 to cause the foot to clamp to the work, as will be presently described.

Referring now more particularly to Figs. 3, 4, 5 and 11, projection 111 has a second lateral extension 142 which merges at its bottom with plate 109. This extension, as shown more clearly in Fig. 3, has a passage 143 opening at one end into bore 114 in said projection 111, said passage being enlarged at its outer end and opening through the end wall of the extension. A conical valve seat 144 is formed at the juncture of the reduced and enlarged portions of the passage. A needle valve 145 has a conical tip disposed adjacent valve seat 144 and is threaded in the open end of passage 143 for adjustment of the valve 145 toward and away from valve seat 144.

Lateral extension 142 has a bore 146 opening through a face thereof and continuing at its inner end in a reduced bore 147 which in turn opens into passage 143 adjacent the threaded end of needle valve 145. A venturi sleeve 148 is threaded in bore 146.

This venturi sleeve is formed with a conventional venturi passage 149 communicating passage 147 to atmosphere and is peripherally grooved at 150, the latter groove communicating through ports 151 with the venturi passage 149 at its throat 152 and with the interior 140 of suction foot 26 through passage 153. Thus, it will be seen that air flow through the venturi passage 149 will tend to evacuate the interior of the suction foot, as will be hereinafter more fully described.

Extending laterally from projection 111 in generally angular inclination to and merging with plate 109 of the work holding device 24 is a generally cylindrical protuberance 154 which is flared at its outer end at 155. Extending into the protuberance through said outer end is a large bore 156 (Fig. 5) which is counterbored at 157 within the limits of the flared outer end 155.

The inner end of large bore 156 is continued in a small bore 158 communicating at its inner end with bore 114. Slideably received in the inner end of large bore 156 and having a reduced stem 159 slideably received in small bore 158 is a piston 160. An O-ring 161 encircles the stem 159 adjacent the juncture of the latter with piston 160, the O-ring seating in a slight annular groove in the stem, as shown.

A recess extends into the outer end of the piston and defines a seat 162 against which bears one end of a coil compression spring 163, the other end of which bears against an annular flange 164 at one end of a cap 165 fixed to the inner end of a shuttle valve stem 166.

Fitted in the outer end of bore 156 and retained therein by a retainer disk 167 backed up by a snap ring 168 is a cylindrical bearing sleeve 169 which is axially bored for slideably receiving the stem 166. The outer end of this bore is counterbored at 170 to receive an O-ring which encircles stem 166 and seals the latter to the bearing sleeve 169. Retainer disk 167 serves to retain the O-ring in position and is formed with a central bore to slideably receive the stem 166, the outer end of which extends a distance beyond the retainer disk.

Bearing sleeve 169 is counterbored at 171 to loosely receive stem 166, said counterbore 171 communicating with a peripheral groove 172 in the sleeve through a radial passage 173. Seal rings seal the sleeve to the wall of bore 156, as shown.

A generally cup-shaped member 174 has an enlarged head 175 fitted in bore 156 and a hollow cylindrical extension 176, of smaller outer diameter than bore 156, bearing against the inner end of sleeve 169. This extension is slotted at 177 to communicate space 178 within the extension to the annular space 179 between the extension and wall of bore 156. Head 175 is sealed to the wall of bore 156 by a seal ring, as shown, and is axially bored at 180 to loosely receive stem 166.

The portion of shuttle valve stem 166 within extension 176 is radially flanged at 181 and peripherally grooved to receive an O-ring 182 for sealingly engaging, in one axial position of stem 166, the valve seat formed by the inner face of sleeve 169 about counterbore 171. A second seal ring 183 encircles stem 166 inwardly of radial flange 181 for sealingly engaging, in the stem position illustrated, the enlarged head 175 about its central bore 180.

Peripheral groove 61 in the forward end of ram 23 communicates with annular space 179 through a passage 184 while bore 114 in projection 111 communicates with peripheral groove 172 in bearing sleeve 169 through a passage 185.

The space between the piston 160 and cup member 174 is vented to atmosphere through a vent port 186.

The outer end of stem 166 is fixed in a central hub 187 of a disk 188, the latter bearing against a flexible diaphragm 189 which has its peripheral edge clamped between a disk 190, closing the end of counterbore 157, and the end face of protuberance 154. Disk 190 is apertured at 191 so as to place atmospheric pressure on the outer side of the diaphragm 189. Space 192 at the inner side of the diaphragm communicates with interior 140 of the suction foot 26 through a passage 193 so that when a vacuum is produced in the foot, atmospheric pressure acting on the outer side of the diaphragm will shift shuttle valve stem 166 and parts carried thereby to their solid line positions of Fig. 5.

The space 194 between the inner end wall of bore 156 and the inner end of piston 160 communicates, via a passage 195 (Figs. 5 and 11) to a large expansion chamber 196 (Fig. 11) concentric with a bore 197 opening through the end face 198 of a generally cylindrical boss 199 projecting rearwardly from plate 109. Bore 197 is counterbored and threaded at its outer end for threadedly receiving a threaded, enlarged head 200 on a pilot valve sleeve 201. Pilot valve sleeve 201 has a reduced diameter portion 202 terminating at its inner end in a relatively enlarged head portion 203 fitted in and sealed to the wall of bore 197 beyond the expansion chamber 196. The juncture of reduced diameter portion 202 and threaded head 200 conforms to a conical surface, the latter bearing tightly against the circular edge formed at the juncture of bore 197 and its counterbore to provide a fluid tight seal.

Bore 197 is continued at its inner end in a reduced bore 204 which receives a coil compression spring 205. Spring 205 bears at one end against the bottom of bore 204 and at the other end against a valve core 206 formed on the end of the valve stem 207 of the pilot valve 34 (Fig. 1).

Sleeve 201 is centrally bored at 208 to slideably receive stem 207 which bore 208 is continued in an enlarged bore 209 for loosely receiving stem 207 so as to provide an annular flow space between the stem and sleeve. The lower end of the sleeve 201 is bevelled about the periphery of bore 209 to form a valve seat into sealing engagement with which valve core 206 is urged by spring 205.

The outer end of stem 207 extends a distance beyond the outer end of sleeve 201 and has a large head 210 for engagement with adjustable stop 33 (Fig. 1) on drill body 20 during operation of the drill, as will presently be seen. Bore 204 communicates with bore 114 through a passage 211 which is normally sealed by valve core 206.

As was previously mentioned, pressure air for operating the drill is received through a flexible hose 22, the latter having a threaded connector 212 (Fig. 1) receivable in a threaded bore in a nipple 213. Nipple 213 is threaded in the end of a bore 214 (Figs. 2 and 10) extending upwardly into handle 21 from its butt end, the bore 214 being continued at its upper end by a slightly reduced bore 215.

Slideable in this latter bore 215 and sealed to the wall thereof by an O-ring, as shown, is a piston 216 which is axially recessed at 217 through its lower end, and peripherally grooved at 218. A port 219 communicates recess 217 and peripheral groove 218, and a vent passage 220, in handle 21, communicates groove 218 to atmosphere.

A bearing sleeve 221, formed with a large bore 222 opening through the lower end of the sleeve and continued at its upper end by a reduced bore 223 opening through the other end of the sleeve, is frictionally received in bore 214 with its upper end abutting the annular shoulder at the juncture of bores 214 and 215. The lower end of the sleeve is spaced from the inner end of nipple 213, as shown. Sleeve 221 is sealed to the wall of bore 214 by the O-rings illustrated and is peripherally grooved at 224 and 225.

Slideable in bore 222 of sleeve 221 is a motor control valve spool 226 which has a bore 227 extending thereinto from its upper end, the bore 227 being continued by a reduced bore 228 which, in turn, is continued at its lower end by a still further reduced bore 229 opening through the lower end of valve spool 226. The lower end of bore 229 is counterbored to form a seat 230 for receiving one end of a coil compression spring 231, the other end of which is received in a counterbore 232 in the inner end of nipple 213.

Spring 231 acts to bias motor control valve spool 226 upwardly in bore 222 of sleeve 221 to a position of sealing engagement of an O-ring 233, carried in a groove in an enlarged lower end portion of the spool, with a conical valve seat 234 at the lower end of the sleeve 221.

A conical valve core 235, adapted in its lower position (Fig. 10) for sealing engagement with the valve seat formed by the annular shoulder 236 at the juncture of bores 227 and 228 in valve spool 226, carries a valve stem 237. Stem 237 extends loosely through bore 223, in the upper end of sleeve 221, and has its upper end abutting the bottom of recess 217 in piston 216. A reduced diameter stem 238 extends downwardly from valve core 235 and is loosely received in bore 229 of valve spool 226. A coil compression spring 239, abutting valve core 235 and the shoulder at the juncture of bores 228 and 229 in valve spool 226, biases the core and piston 216 upwardly to a position of sealing engagement (Fig. 2) of an O-ring 240, encircling stem 237 immediately above the core, with the annular shoulder 241 formed at the juncture of bores 222 and 223 in sleeve 221.

The above-described parts occupy the positions of Fig. 2 when trigger 36 is released.

Handle 21, adjacent the juncture thereof to drill body 20, is formed with a bore 242 opening through the forward face of the handle and into the space between a pair of ears 243 to which trigger 36 is pivoted. The forward end of bore 242 is counterbored and threaded for receiving a threaded nipple 244 which is peripherally grooved at 245 and sealed at its rearward extremity to the wall of bore 242.

Nipple 244 is axially bored at 246 and counterbored at 247 for receiving a stem 248 whose forward end abuts trigger 36 and the after end of which is radially enlarged and peripherally grooved to receive an O-ring 249. A coil compression spring 250 biases stem 248 forwardly to a position of sealing engagement of its O-ring 249 with the after face of nipple 244, the latter being formed with ports 251 communicating counterbore 247 with peripheral groove 245.

The space 252, between nipple 213, in the butt of the handle, and sleeve 221, communicates with bore 242 through passages 253, 254 and 255 in handle 21. When trigger 26 is depressed to unseat seal ring 249, as will be hereinafter more fully described, bore 242 communicates with recess 39 in the drill body 20, via passage 256, communicating at one end with groove 245 in trigger nipple 244, and passage 254'. Passage 254' constitutes a reduced continuation of passage 254, there being for facility of manufacturing, a plug 257a at their juncture, so as to form, in effect, two separate passages.

The air inlet, not shown, of motor 94, communicates with groove 225 in sleeve 221 via passages 257, 258 (behind passage 254 in Figs. 2 and 10) and 259, shown in dotted lines in Figs. 2 and 10. Groove 225, in turn, communicates with a groove 260 in valve spool 226 through port 261. During operation of the drill, valve spool 226 is shifted downwardly against the action of spring 231 to a position wherein the lower annular wall of groove 260 in the valve spool is spaced below the lower end of sleeve 221 so as to communicate motor 94 with space 252.

Groove 224 in sleeve 221 communicates with piston chamber 49' rearwardly of piston 49 through a passage 262 and a port 263 in head 42. Passage 262, as well as passages 254, 254' mentioned above, are made by drilling long bores into the handle 21 through its butt end and plugging the lower, open ends of these bores, as shown. Groove 224 also communicates with bore 222 in sleeve 221, above valve core 235, through port 264.

Finally, bore 215 in handle 21, above piston 216, communicates with peripheral groove 48 in linear barrel 47 through a passage 265.

Operation of the drill is as follows.

Assuming the drill to be in its inoperative condition with trigger 36 released, the movable parts of the drill will occupy the positions of Fig. 2.

In this inoperative condition of the drill, valve spool 226, comprising the control valve for air motor 94, occupies a position due to the action of spring 231, wherein its O-ring 233 sealingly engages conical seat 234. Also, valve core 235, comprising the control valve for feed cylinder 49', occupies a position under the action of spring 239, wherein it is spaced from its seat 236 and its O-ring 240 sealingly engages shoulder 241 on sleeve 221.

At this time, air entering through hose 22 passes upwardly through space 252, bores 229 and 228 in valve spool 226, past the now unseated valve core 235 and thence via port 264, groove 224, passage 262 and port 263 into feed cylinder 49', the pressure developed in the latter acting on piston 49 to move it and ram 23 to the extended positions shown in Fig. 2. The work engaging head 24, including suction foot 26, drill bushing 28, and spindle guide sleeve 27 will, accordingly, be in their fully extended positions of Fig. 2.

Air may also pass via passages 253, 254 and 255 into trigger valve bore 242, but is precluded from flowing through passages 256 and 254' into recess 39, stem 43 and thence to the suction foot 26, by virtue of the sealing engagement of O-ring 249, on the trigger valve stem 248 with the end of bearing sleeve 244 under the action of spring 250. Moreover, air is prevented from flowing to the air motor 94 through groove 260, port 261 and passages 257, 258 and 259 due to sealing engagement of valve spool O-ring 233 with its seat 234. Air entering the drill is sealed at 240, 241 against escaping to atmosphere through vent 220 via the bore 223 around loosely fitted valve stem 237, recess 217 in piston 216, port 219 and groove 218.

When a hole is to be drilled, feet 128 and face 123 of drill bushing 28 are brought to bear against the surface of the workpiece. Lips 131 and the forward edges of walls 133, defining the suction cups 134, 134a and 134b of suction foot 26, will also bear against the work surface and will be slightly flexed as shown in Fig. 6.

Trigger 26 is now depressed to unseat trigger valve O-ring 249 permitting the passage of air from trigger valve bore 242 in the handle to bore 114 in the projection 111 on the work engaging device 24 via ports 251, groove 245, passages 256 and 254', recess 39, passage 43' through hollow stem 43, bore 53 in the forward end of the ram 23, and thence through filter screen 117 into bore 114. From bore 114 air passes (Figs. 3 and 4) through bore 143, past needle valve 145 and through venturi passage 149 to atmosphere with the resultant formation of a reduced pressure at the throat 152 of the venturi. Assuming, for the moment, that lips 131 and the forward edges of walls 133 effect a perfect seal with the work and that the latter has no holes therethrough, the reduced pressure at the throat 152 of the venturi will cause evacuation of the air from the interior of the suction foot, air flowing from within each of the main suction cups 134 through orifices 139 in flexible diaphragm 132, and openings 141 in plate 135 to the space 140 and hence through passage 153 into venturi passage 149. Atmospheric pressure, acting on the external surface of the suction foot, or on the work, where the latter is a loose piece, causes adherence of the foot to the work, the lips 131 and walls 133 becoming further flexed, as shown in Fig. 7, under the force developed by such pressure.

If the work has a hole H therethrough, as illustrated in Fig. 7, the pressure differential developed across the flexible diaphragm 132, at the portion thereof forming the bottom wall of that one of the main suction cups 134 which overlies the hole H, due to the flow of air through the orifice 139 in such portion of the diaphragm, will cause the latter to be deflected toward plate 135 and said orifice to be sealed off, as shown. This sealing off of the main suction cup 134 which overlies the hole H permits a vacuum to be produced in the remainder of the cups and thus clamping of the suction foot to a workpiece even though the latter have one or more holes therethrough. Also, if a particle of foreign matter, for example, between the work and one of the walls 133 prevents sealing of the wall at that point to the work, or the main suction cup walls do not seal to the work for some other reason, air will be merely drawn from the adjacent secondary suction cup 134a or 134b until the latter is also evacuated. The clamping force of the foot is, therefore, not diminished but actually increased by failure of one or more of the walls of the main cups 134 to seal to the work.

Evacuation of the suction foot is accompanied by evacuation of space 192 behind flexible diaphragm 189 (Fig. 5), and atmospheric pressure acting on the outer side of the diaphragm moves the latter and shuttle valve stem 166 carried thereby to the left, as viewed in Fig. 5, against the action of spring 163 to the solid line position of Fig. 5 wherein shuttle valve O-ring 183 sealingly engages head 175 on cup member 174. Air is thus prevented from escaping through bore 180, around the loosely fitted stem 166 therein, and vent 186 to atmosphere.

With stem 166 shifted to the solid line position of Fig. 5, air is permitted to flow from bore 114 through passage 185, groove 172 and port 173 in sleeve 169, through bore 171 in the latter around the stem therein, and thence through port 177, annular space 179, and passage 184 to the annular groove 61 in the end of ram from whence it flows via passage 60 (Fig. 2), annular space 57 between stem 43 and ram 23, and port 56 into feed cylinder 49' forwardly of piston 49. From feed cylinder 49', air passes through port 59 and peripheral groove 48 in liner barrel 47, and passage 265 into bore 215 above piston 216. The pressure produced in bore 215 moves piston 216 downwardly against the action of spring 239 to unseat O-ring 240 on the valve 235 and move the latter into sealing engagement with its seat 236. Feed cylinder 49', rearwardly of piston 49, is now vented to atmosphere through port 263, passage 262, groove 224, port 264, bore 223, around loosely fitted stem 237 therein, recess 217 in piston 216, port 219, groove 218, and vent port 220. Seating of valve core 235 against its seat 236 prevents air, entering through hose 22, from escaping through this latter vent. After engagement of valve core 235 with its seat 236, continued downward movement of piston 216 will produce downward movement of valve spool 226 and unseating of its seal ring 233 to permit flow of air past the spool, as heretofore described, through passages 257, 258 and 259 to motor 294 to cause driving thereof and rotating of the drill spindle 29.

The above-described venting of feed cylinder 49' at the rear of piston 49 and admission of pressure air to the cylinder 49' forwardly of the piston causes relative rearward retraction of the piston 49, ram 23 and work engaging head 24, including suction foot 26 and drill bushing 28, to the position of Fig. 10, with resultant feeding of the drill bit 30 into the work. The speed of such retractile movement of the piston and ram is controlled by the combined action of the restricted flow of oil through the reduced orifices 72 in valve plate 68, carried by the ram, and the restricted flow of oil from chamber 73, rearwardly of disk 66, through port 75, groove 38′, into chamber 73, forwardly of disk 66 through replenishing cylinder 76 (Fig. 2a), groove 38 and passage 74. The rate of this latter restricted oil flow may be controlled, as previously indicated, by adjustment of stop 80′ to vary the maximum spacing between ball check valve 79 and its seat 78. This adjustment permits varying of the speed of retractile movement of the ram and piston and hence the rate of advance of the drill through the work. The above-described air flow during retraction of the work engaging head is diagrammatically indicated in Fig. 12.

If the work be a free piece, it will be drawn, along with the suction foot, toward the drill body 20 over the drill bit 30. If the work is a stationary structural member, drill body 20, together with drill spindle 29 and drill bit 30 carried thereby, are moved toward the work with a resultant advancing of the drill bit through the work.

If a vacuum is not produced in suction foot 26, when trigger 36 is depressed, due perhaps to an obstruction which prevents the formation of an air tight seal between the work and suction foot, space 192 behind diaphragm 189 will not be evacuated and the latter will remain in its normal position, shown in phantom lines in Fig. 5. In this position of the diaphragm, shuttle valve stem 166 is urged by spring 162 to a position of sealing engagement of its O-ring 182 with the inner end of sleeve 169, so as to prevent the flow of air from bore 171 in the sleeve to passage 184 and thence to piston 216 (Fig. 2) through the passages heretofore mentioned. Air will, therefore, not be delivered to motor 94 or feed cylinder 49′, forwardly of the piston 49, and the drill will remain inoperative. Thus, the suction foot 26 must be clamped to the work before the drill bit 30 may be advanced therethrough.

The aforementioned retractile movement of piston 49, ram 23 and work engaging device 24 continues until abutment of adjustable stop 33 (Fig. 11) with head 210 on pilot valve stem 207 causes downward movement of the latter, as viewed in Fig. 11, to unseat its valve core 206.

Flow of air now takes place from bore 114 in projection 111 of the work holding device, into space 194 (Fig. 5) behind piston 160 via passage 211, past the now unseated valve core 206, bore 209 in pilot valve sleeve 201, port 201′, expansion chamber 196, and passage 195. The pressure in space 194 acts to move piston 160 to the right, as viewed in Fig. 5, initially against the action of spring 163. Continued right hand movement of piston 160, after abutment of the latter with cap 165 on shuttle valve stem 166, causes shifting of the latter against the action of atmospheric pressure acting on diaphragm 189, to a position wherein reduced extension 159 of piston 160 has been withdrawn from bore 158 and O-ring 182 on the stem sealingly engages the inner end of sleeve 169 to cut off the supply of air to the feed cylinder 49′, forwardly of piston 49, and bore 215 in the handle above piston 216 (Fig. 2). Simultaneously with this cutting off of the air supply to the forward end of feed cylinder 49′, the latter is vented to atmosphere by unseating of O-ring 183 on the shuttle valve stem 166 (Fig. 5) through port 56 (Fig. 2), annular space 57, port 60, groove 61, passage 184 (Fig. 5), annular space 179, port 177, bore 180 around the loosely fitted shuttle valve stem 166 therein, and vent port 186.

Cutting off of the supply of air to and venting of bore 215 above piston 216 results in return of the latter, the valve core 235 and valve spool 226 to their normal positions, shown in Fig. 2, wherein air is sealed at 233 against passage to motor 94, valve core 235 is unseated from its valve seat 236 and O-ring 240 is sealed against its seat 241. Air now flows into feed cylinder 49′ rearwardly of piston 49 through bores 229 and 228 in valve spool 226, past valve core 235, through port 264, groove 224, passage 262 and port 263, to return piston 49, ram 23 and work engaging device 24 to their extended positions shown in Fig. 2. The above-described air flow during extension of the work engaging head 15 is diagrammatically indicated in Fig. 13.

Thus, each actuation of trigger 36 causes work engaging head 24, including the suction foot, to move automatically through a single cycle consisting of movement from extended position (Fig. 2) to retracted position (Fig. 10) and return to extended position. It will be observed, however, that as long as the trigger is depressed, air will be delivered to the venturi 149 to retain the drill clamped to the work, and to the space 194 (Fig. 5) to maintain shuttle valve piston 160 in its aforedescribed right-hand position against the action of atmospheric pressure on diaphragm 189. Release of trigger 36 will permit seating of trigger valve O-ring 249 to cut off the supply of air to the venturi to release the work, and to space 194 whereupon shuttle valve piston 160, stem 166 and the diaphragm 189 will return to their normal positions.

A modified form of the suction foot is illustrated in Fig. 9 wherein the diaphragm 132′, corresponding to diaphragm 132 in Figs. 1–8, is bonded to the backing plate 135 and the openings 139′ in the diaphragm are made somewhat larger than those of the plate. Thus, no provision is made for sealing off those of the compartments 134′ which may overlie a hole in the work. In this latter case there is contemplated a vacuum producing means in the tool having sufficient capacity to cause adherence of the foot to the work with a given number of unsealed compartments.

Figs. 14 through 17 illustrate a modified form of the present portable power tool and suction foot combination. The tool 300 of these latter figures is generally similar to the tool of Fig. 1, and comprises a tool body 302 including a handle 304. This handle has an air inlet 306 at its butt end and encloses valve means, generally indicated at 308, identical to the handle enclosed valve means in my co-pending application, Serial No. 591,910, filed June 18, 1956, now abandoned, and entitled Pneumatic Power Drill With Spacing Device. See my copending application Serial No. 732,635, entitled Power Drill With Work Holding Device and Spacing Means, filed May 2, 1958, as a continuation-in-part of Serial No. 591,910. This valve means comprises a manual trigger 310.

When the trigger 310 is actuated, the trigger valve 312 unseats in the manner described in said application, Serial No. 591,910. Air from the inlet 306 is thereby permitted to flow from a passage 314, opening at 316, into the handle chamber 318 between the valve means 308 and the inlet 306, past the trigger valve 312 to a passage 320 in the wall of the housing 302. This passage 320 communicates with a flexible conduit 322. Conduit 322 leads to an aspirator and control valve assembly, generally indicated at 324, carried on a modified suction foot 326.

As will be presently more fully described, air flows from the conduit 322 through an aspirator embodied in the assembly 324, to effect evacuation of a flexible suction cup 328, secured to the underside of the foot 326, to cause adherence of the latter to the surface of the workpiece. Also embodied in the assembly 324 is a vacuum operated control valve, to be presently described, which is opened in response to a predetermined vacuum in the suction cup 328, to permit flow of air from the conduit 322 to a conduit 330. This latter conduit connects to the lower end, as the tool is viewed in Fig. 14, of a hollow piston rod 332. The suction foot 326 is flexibly attached to the lower end of this piston rod 332.

As will be hereinafter more fully discussed, air flows upwardly through the interior of the piston rod 332 to the underside of a piston 334, attached to the upper end of the piston rod, and thence through the valve means 308 to a spindle drive motor 336 to cause retraction of the foot 326 toward the tool body 302, and rotation of the tool spindle 338.

The suction foot 326 comprises a rigid frame 340, illustrated most clearly in Fig. 17. As shown in this latter figure, the frame 340 comprises a pair of spaced, parallel sections 342 which are centrally bridged by a rectangular block 344. The right-hand ends of the sections 342, as the frame 340 is viewed in Fig. 17, form a pair of divergent legs 346 to the undersides of the free ends of which are affixed a pair of semi-spherical work engaging feet 348. Bridging the left-hand ends of the frame sections 342 is a generally semi-cylindrical rib 350 to the undersides of the free ends of which are affixed a pair of semi-spherical buttons 352.

Referring again to Fig. 14, piston rod 332 has threaded on its lower end a rigid arm 354 which extends laterally to opposite sides of the piston rod, as shown. Suction foot 326 is secured to the right-hand end of this arm by means of a flexible strap 358 which is secured at one end to the arm 354 and its other end to the top of the block 344 embodied in the suction foot frame 340. The right-hand end of this strap overlies a cover plate 360 which is bolted to the upper side of the block 344, for reasons to be seen.

The left-hand end of the arm 354, as the tool is viewed in Fig. 14, has a bore concentric with the spindle 338 in which is received a shouldered bushing 362. The lower end of this bushing is externally threaded and extends below the arm 354, as shown. Threaded on this extending end of the bushing 362 is a pressure bushing 364, formed with a chip clearance opening 366. The lower end face 368 of this pressure bushing is flat and disposed in a plane perpendicular to the axis of the spindle 338.

Projecting from diametrically opposite sides of the pressure bushing 364, as the latter is viewed in Fig. 15, are a pair of shoulders 370, having upper conical surfaces, as shown. The pressure bushing 364 is partially encircled by the semi-cylindrical rib 350 on the suction foot frame 340, the buttons 352 on the frame seating against the upper conical surfaces of the bushing shoulders 370, in the manner illustrated in Fig. 15.

During operation of the tool, clamping of the suction cup 328 to the surface of a workpiece rocks the left-hand end of the suction foot frame 340, as the tool is being viewed in Fig. 14, toward the work, about the work-engaging feet 348 as a center. This results in pressing of the buttons 352, on the suction foot frame, against the shoulders 370 on the pressure bushing 364 to press the flat lower face 368 of the bushing. flatly against the surface of the work. Owing to the flexible connection 358 between the suction foot 346 and the arm 354, and the point contact between the buttons 352 on the suction foot frame and the pressure bushing shoulders 370, the suction foot may rock relative to the pressure bushing 364 and yet firmly clamp the end face 368 of the bushing flatly against the work surface. It will be clear, therefore, that the pressure bushing will be rigidly held against the work with its axis normal to the area of the work surface engaged by the end face 368 of the bushing, even though the surrounding work surface area, which is engaged by the suction cup 328 and work engaging feet 348 on the suction foot, is inclined with respect to said area.

This feature of the modified tool of Fig. 14 is especially advantageous and desirable when working on aircraft structures, since in many instances it is necessary to position the bushing with its axis perpendicular to a localized area to be worked on, which area is surrounded by a contoured or inclined surface. Thus, the tool is uniquely adapted to rivet shaving operations on aircraft structures. In this case, the undersurface 368 of the pressure bushing 364 will be pressed flatly against the area immediately surrounding the rivet head, so that the axis of the bushing will be accurately perpendicular to the upper face of the rivet. In these instances, the tool 372 secured to the forward end of the spindle 338 will comprise a rivet shaving tool. Obviously, however, this feature of the invention is also desirable in other operations, such as drilling and countersinking operations.

Referring now to Fig. 16, the block 344 of the suction foot frame 340 will be seen to be internally bored to form a series of air passages communicating with the air conduit 322. One of these passages, indicated at 374, terminates in an enlarged, internally threaded portion 376 which opens through the side of the suction foot frame 340, as shown. Threaded in this enlarged portion 376 of the passage is a venturi 378, the throat of which communicates with the interior of the suction cup 328, through a passage 380, which may be seen most clearly in Fig. 14. Air flowing from the conduit 322 through the passage 374 and the venturi 378 to atmosphere, therefore, evacuates the suction grip 328 when the latter is engaged with the surface of a workpiece. A needle valve 382 is provided for adjusting the air flow through the passage 374 to obtain optimum air flow through the venturi 378 for any given air supply pressure.

From what has been said, therefore, it will be seen that actuation of the trigger 310, with the suction grip 328 engaged with the surface of the workpiece, results in the evacuation of the suction grip and clamping of the suction foot 326 to the work. For simplicity, the suction grip has been illustrated as comprising a single, large compartment or chamber. It will be apparent, however, that the suction grip could, as well, be compartmented in the manner described with reference to Figs. 1 through 13.

A second passage 384 (Fig. 16) in the block 344 opens into an enlarged bore 386, generally centrally located in the block 344. This bore extends normal to the upper and lower faces of the block and opens through the latter face. This open end of the bore 386 is closed by a plug 388, which may be seen most clearly in Fig. 14.

Bore 386 continues at its upper end in a reduced bore 390 which, in turn, opens at its upper end into a relatively large circular recess 392 in the upper face of the block 344. The upper end of this recess is closed by a flexible diaphragm 394 which is held in place and backed by the previously mentioned cover plate 360.

This cover plate has a port 396 which communicates the recess 392, above the diaphragm 394, to atmosphere. A passage 398 communicates the recess 392, below the diaphragm 394, to the interior of the suction grip 328. From this description, it will be seen that during operation of the tool, atmospheric pressure acts on the upper side of the diaphragm 394 while the reduced pressure in the suction grip 328 acts on the lower side of the diaphragm.

Slideably received in the bore 390 is a valve member 400, which, in its illustrated closed position of Fig. 14, seats against the annular shoulder at the juncture of the bores 386 and 390 to prevent flow of air from the bore 386 into bore 390. The valve member 400 is normally retained in this closed position by a compression spring 402.

Fixed to the upper end of the valve member 400, which projects above the bottom wall of the recess 392, as shown, is a disc 404 on which the diaphragm 394 rests.

When, during operation of the tool, the pressure differential between atmospheric pressure acting on one side of the diaphragm 394 and the reduced internal suction grip pressure acting on the other side of the diaphragm becomes sufficient to overcome the spring 402, the valve member 400 is moved downwardly to an open position wherein air entering the lower enlarged bore 386 through the passage 384 may flow around the valve member to a passage 406 (Fig. 14), communicating with the conduit 330, leading to the hollow piston rod 332. From the description of the tool thus far, it will be evident that when the trigger 310 is actuated, with the suction grip 328 bearing against the surface of the workpiece, the grip is evacuated to cause clamping of the suction foot 346 to the work and pressing of the lower end face 368 of the pressure bushing 364 against the surface of the work. When the suction grip 328 is evacuated to a predetermined reduced pressure, the valve member 400 is unseated by atmospheric pressure. Air then flows from conduit 322, through the passage 384, past the valve member 400 to the passage 406 and thence through the conduit 330 to the interior of the hollow piston rod 332.

The arrangement of the cylinder assembly, generally indicated at 408, in which the piston rod 332 and its piston 334 operate, is substantially the same as that embodied in the tool of Figs. 1 through 13. The cylinder assembly will not, therefore, be described in great detail. Suffice it to say, the forward end of the cylinder bore 410 in the tool housing 302 is closed by a fixed disc 412 through which piston rod 332 slideably extends.

Located in the bore 410 is a second fixed disc 414 through which the piston rod 332 also slideably extends and which defines, with the first disc 412, a chamber 416 which is filled with fluid. A piston 418, fixed on the piston rod 332, moves in this chamber.

Chamber 416, at opposite sides of the piston 418, communicates through a check valve (not shown in Fig. 14), identical to that described with reference to Figs. 1 to 13. This check valve regulates the rate at which fluid may flow from one side of the piston 418 to the other side during movement of the piston rod 332, so as to control the rate of retraction of suction foot 346 toward the tool body.

Mounted on the piston 418 are check valve means 420 which permit relatively rapid extension of the suction foot 346 at the end of an operating cycle, as in the tool of Figs. 1 to 13.

The interior of the piston rod 332 communicates to the space between the piston 334 and the inner disc 414 through a passage 422. Thus, air admitted to the piston rod 332 by the previously described operation of the vacuum operated valve member 400 flows through the passage 422 to the underside of the piston 334, and moves the latter and its piston rod upwardly, as the tool is viewed in Fig. 14. This, of course, causes retraction of the suction foot 326, arm 354, and the bushings 362 and 364, secured to the arm, toward the tool body 302.

Piston 334 is slideable in a cylinder sleeve 424, the interior of which, between the piston 334 and the disc 414, communicates with an annular recess 426 between the sleeve 424 and the wall of the cylinder bore 410, through a port 428. This recess 426, in turn, communicates to the valve means 308 through a passage 430.

Air flowing to the valve means through this passage 430 operates the valve means 308 in the manner more fully described in the aforementioned co-pending application, Serial No. 591,910, to vent the interior of the cylinder sleeve 424 above the piston 334, and supply air to the motor 336. This motor drives the spindle 338 through gearing described with reference to Figs. 1 through 13. The suction foot 336 is thereby retracted toward the tool body 302 as the spindle 338 turns. The work, if a free piece, is drawn toward the tool bit 372 with the suction foot. If the work is a fixed piece, of course, the suction foot remains stationary and the tool body 302, spindle 338, and tool bit 372 thereon are moved toward the work, as previously mentioned.

Relative retraction of the suction foot toward the tool body is limited by engagement of a plunger 432, which projects forwardly of the tool body, as shown, with the upper face of the bushing 362. This plunger forms a part of a limit stop means, illustrated in detail in Figs. 12 and 13 of the aforementioned co-pending application, S.N. 591,910, and described in that application. This limit stop means has not been illustrated in the present case, except for the plunger 432, since it is identical to that described in the latter application.

As discussed in the latter application, this valve means is operative in response to movement of the plunger 432 toward the tool body 302, to vent the valve means 308 above the piston 434 thereof, as well as the space below the suction foot piston 334, to atmosphere through a passage (not shown) communicating to the annular passage 426 about the cylinder sleeve 424. The valve 308 is thereby returned to its normal condition illustrated, to cut off the flow of air to the motor 336 and admit pressure air from the inlet 306 through a passage to the cylinder sleeve 424 above the piston 334. The suction foot is thereby returned to its normal extended position in readiness for the next operating cycle. Air continues to flow through the venturi 378 to retain the suction grip 328 evacuated, however, until the trigger 310 is released. When the trigger is released, the pressure in the suction grip rises and the valve member 400 is returned to its normally closed position under the action of its spring 402.

Figures 18 and 19 illustrate a modified form of suction foot which is especially designed for adhering to relatively rough surfaces, such as concrete, brick or plaster surfaces. This suction foot comprises flexible side walls or lips 500 which are relatively thick, as shown. The work engaging faces of these lips are formed with a continuous groove 502 which extends completely around the suction grip. Positioned in this groove is a bead 504 of cold flow material such as a silicone putty material, for example. Other types of cold flow material may, however, be employed.

In use of this form of suction foot, the latter is placed against work surface and the upper surface of the wall or lip 500 is tapped with a hammer or the like, about its entire periphery, to force the cold flow material 504 into intimate sealing contact with the surface. Owing to its cold flow characteristics, this material will fill in the pores in the surface so as to establish an efficient airtight seal between the suction grip and the material surface.

This suction grip may, of course, be employed on either the tool illustrated in Figs. 1 to 13 or Fig. 14, or, for that matter, any type of tool embodying the suction grip of this invention.

Figure 20:
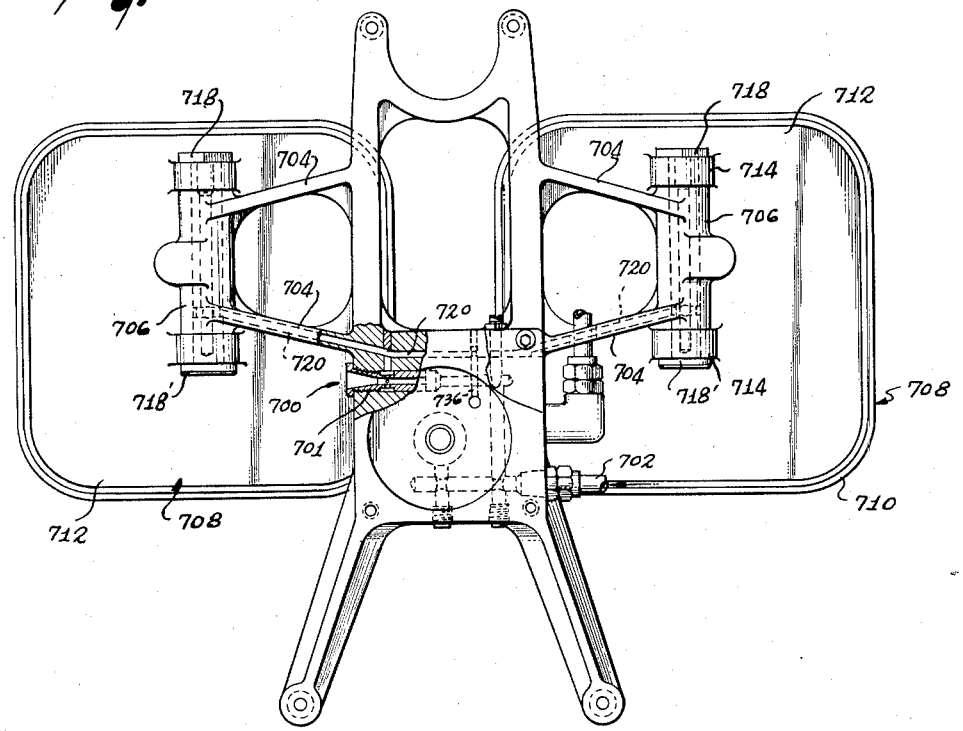
Fig. 20 is a plan view of an articulated suction foot design with parts broken away for clarity.
Figure 21:
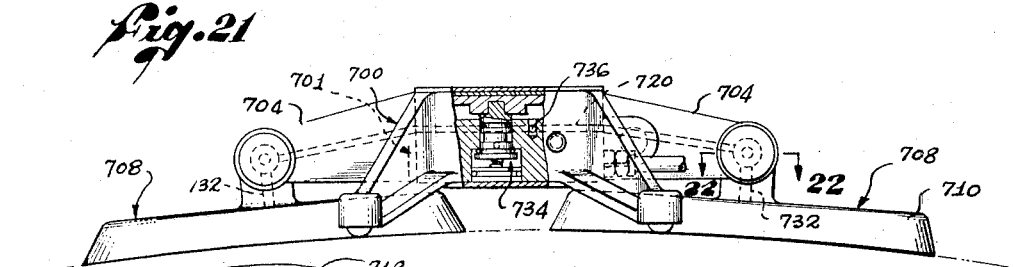
Fig. 21 is a side elevation of the articulated suction foot of Fig. 20 with parts broken away.
Figure 22:
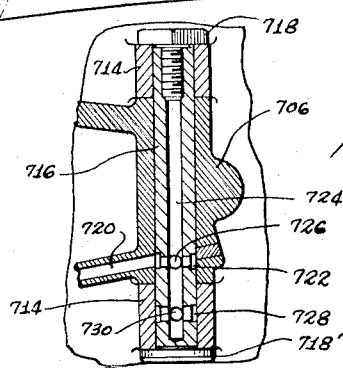
Fig. 22 is an enlarged section taken along line 22—22 of Fig. 21.

Figs. 20–22 illustrate an articulated suction foot which is designed for clamping onto curved or other non-planar surfaces. This foot comprises a frame 700 which is identical to the frame 340 in Fig. 17, except for the differences hereinafter noted. This foot may be used with the power tool of Fig. 14, for example, and may be attached to the tool in the same manner as the suction foot 326 of that figure.

The frame 700 encloses the same aspirator means 701 and control valve means (not shown) as the frame 340, and has an air inlet 702 through which air is adapted to flow to said means.

Extending from opposite sides of the frame 700 are pairs of arms 704. Integrally formed on the outer ends of each of these pairs of arms is a sleeve bearing 706. Indicated at 708 are a pair of generally square suction cups, each having flexible side walls 710 and a rigid top plate 712. Each of the plates 712 is formed with a pair of upstanding, coaxially bored bearing lugs 714 which straddle a sleeve bearing 706, as shown.

The suction cups 708 are hinged to the frame 700 by means of bearing pins 716 which have a sliding fit in the sleeve bearings 706 and bearing lugs 714. Bolts 718 threaded into opposite ends of the pins 716 releasably retain the latter in position in the sleeve bearings and bearing lugs.

From this description, it will be clear that the suction cups 708 can pivot with respect to one another so as to accommodate sealing contact of the cups with a curved surface, as illustrated in Fig. 21, for example.

To provide for evacuation of the suction cups by the aspirator means 701, one arm of each pair of arms 704 is formed with a passage 720 which communicates with the throat of the aspirator, as shown in Fig. 20. The outer ends of these passages communicate with annular grooves 722 in the bearing pins 716.

Opening into these grooves and into axial passages 724 through the bearing pins 716 are ports 726. Axial passages 724 communicate with second annular grooves 728 in the ends of the bearing pins within two bearing lugs 714 through ports 730, as shown in Fig. 22. These latter grooves, in turn, communicate to the interiors of the suction cups 708 through passages 732 extending through the lugs 714.

Thus, air flow through the aspirators 701 effects evacuation of the suction cups 708 to cause clamping of the latter to the surface of a workpiece as in the previous forms of the invention. While the suction cups have been illustrated as comprising a single large compartment, they may, obviously, be divided into smaller, self-sealing compartments in the manner previously described.

Indicated at 734 is a vacuum operated control valve identical to the vacuum operated control valve of Fig. 14 in construction, operation and purpose. The lower side of the diaphragm of this valve communicates to the passage 720 through a passage 736 so as to lie at substantially the same pressure as the interiors of the suction cups. When the latter are evacuated, therefore, valve 734 is opened to admit air to the tool (not shown), attached to the foot, as in the case of the tool of Fig. 14.

Obviously, numerous modifications are possible in the light of the foregoing teachings. It is to be understood, therefore, that within the scope of the co-pended claims the invention may be practiced otherwise than as specifically described herein.

I claim:

1. A work holder comprising: a suction grip including a plurality of separate suction cups engageable with the surface of a workpiece; evacuating means for exhausting said suction cups to cause adherence thereof to the work surface, each suction cup having an air passage communicating the interior of the cup to said evacuating means; and means associated with each cup for sealing of its passage in response to a predetermined rate of air flow therethrough from the cup to said evacuating means.

2. A work holder, comprising: a suction grip having an open forward side and including a rear wall remote from said open side, a plurality of flexible lips joined to and extending forwardly of said wall for sealing engagement with the surface of a workpiece, said lips and wall defining a plurality of separate suction cups open at said forward side of said suction grip, said suction grip having wall means rearwardly of said first-mentioned wall and defining with the latter a closed evacuation space, said first-mentioned wall being formed with a plurality of restricted openings each communicating the interior of one of said suction cups and said space, and evacuating means communicating with said evacuation space for exhausting said suction cups through said openings to cause adherence of said suction grip to a work surface.

3. A work holder, comprising: a suction grip having an open forward side and including a flexible rear wall remote from said open side, a plurality of flexible lips joined to and extending forwardly of said wall for sealing engagement with the surface of a workpiece, said lips and wall defining a plurality of separate suction cups open at said forward side of said suction grip, said suction grip having wall means rearwardly of and peripherally sealed to said first-mentioned wall and including a rigid wall disposed in slightly spaced, parallel relation to said flexible wall, said flexible wall having a plurality of restricted openings each communicating the interior of one of said suction cups to the space between said flexible wall and said rigid wall, and evacuating means communicating with said space for exhausting the latter and thereby said suction cups through said restricted openings to cause adherence of said suction grip to the surface of a workpiece, a predetermined rate of air flow through any one of said restricted openings from the adjacent suction cup to said space creating a pressure differential across said flexible wall about said one opening to cause said flexible wall about said one opening to flex into contact with said rigid wall and seal off said adjacent cup from said space.

4. The subject matter of claim 3 wherein one of said walls is formed with a series of beads spaced from said openings and engaging the opposing surface of the other wall to normally retain a spacing between said walls.

5. The subject matter of claim 4 wherein said beads defining cells opposite said suction cups and said rigid wall has passage means communicating the several cells with said evacuating means, said passage means being misaligned with said restricted openings and being of larger effective area.

6. The subject matter of claim 3 wherein one of said walls is formed with beads spaced from said restricted openings and engaging the opposing surface of the other wall to normally maintain a spacing between said walls, said beads defining cells opposite said suction cups, said wall means defining a second space rearwardly of said rigid wall, said rigid wall having a plurality of openings communicating said cells into which said restricted openings with said second space, said openings in the rigid wall being misaligned with respect to and of greater area than said openings in said flexible wall, and said evacuating means communicating to said second space.

7. A work holder, comprising: a suction grip having a forward open side and including an annular flexible rear wall remote from said open side, annular flexible lips joined to the inner and outer edges of said rear wall and extending forwardly of the latter for sealing engagement with the surface of a workpiece, said lips defining an annular space therebetween, additional flexible lips joined to said wall and first-mentioned lips and extending radially across said space to define a plurality of separate, generally sector-shaped suction cups, said suction grip including a rigid annular wall spaced slightly rearwardly of and parallel to said flexible wall to define a space therebetween, one of said walls having a series of radial beads overlying said radial lips and engaging the opposing surface of the other wall for normally maintaining a spacing between said walls, said flexible wall having a plurality of restricted openings each communicating the interior of one of said suction cups and said latter space between the adjacent beads, and evacuating means for exhausting said latter space between said beads and thereby said suction cups through said restricted openings, the portions of said flexible wall about said restricted openings therein being adapted by flexure of said wall to contact with said rigid wall to seal off said adjacent suction cup.

8. A work holder, comprising: frame means including three work engaging means having forward work engaging ends providing three point contact of said frame means with the surface of a workpiece, a suction cup fixed to said frame between said work engaging means and including flexible lips having forward work engaging surfaces which are normally coplanarly disposed in a plane spaced slightly forwardly of the plane of said work engaging ends of said work engaging means for sealing engagement of said lips with the surface of a workpiece, evacuating means for exhausting said suction cup to cause adherence of the latter to the work surface and pressing of said work engaging means against the work surface, a power tool carried by said frame, said power tool having a bit extending toward the work, one of said work engaging means comprising a cage on said frame surrounding said bit.

9. A work holder for a portable power tool, comprising: a member to be rigidly attached to the tool, a bushing on said member for surrounding a tool bit, said bushing having a forward work engaging face, a frame, means supporting said frame on said member for relative flexing of said frame and member about an axis paralleling said face, said bushing having rearwardly facing, external circumferential shoulder means and said frame having means at one end rockably engaging said shoulder means, a pair of work engaging members on the other end of said frame, said face and members providing a three point support for said work holder on a work surface, a suction cup fixed to the forward side of said frame between said ends thereof, said suction cup including forward, flexible lips having forward coplanarly disposed surfaces normally disposed slightly forwardly of said face and work engaging members for sealing engagement with the surface of a workpiece, and evacuating means for exhausting said suction cup to cause adherence thereof to the work surface and pressing of said end face of the bushing flatly against the work surface.

10. A work holder for a portable power tool, comprising: a rigid frame, means for attaching said frame to a tool, a pair of spaced suction cups supported on said frame for rocking relative to the latter about substantially parallel axes, said suction cups including flexible lips having forward, work engaging surfaces coplanarly disposed in planes substantially paralleling said axes, said cups being rockable about said axes between normal positions wherein said planes are substantially coplanar and positions wherein said planes are inclined, and means for exhausting said suction cups to cause adherence of the latter to a work surface.

11. The subject matter of claim 10 including work engaging elements on said frame, said elements having forward work engaging ends disposed slightly rearwardly of said work engaging surfaces of said lips in the normal positions of the suction cups.

12. A work holder for adhering to rough surfaces, comprising: a suction grip including flexible lips having forward work engaging surfaces, said surfaces of the lips having a forwardly opening groove therein which extends completely around the suction cup, a bead of plastic material in said groove and projecting forward of said forward surfaces of the lip so as to be adapted to be firmly pressed against a work surface, and means for evacuating said suction cup to cause adherence of the latter to the work surface.

13. A work holding device for a tool, comprising: a body; hollow suction grip means having an open side sealingly engageable with the surface of a workpiece; means supporting said suction grip means on said body for retractile and extensible movement relative to the latter along a given direction line; said suction grip means having a normal extended position relative to said body; means for evacuating said suction grip means to cause adherence of the latter to the workpiece; means responsive to a predetermined vacuum in said suction grip means for retracting said suction grip means relative to said body from said normal position; and means automatically responsive to predetermined relative retraction of said suction grip means to a given limiting position for extending said suction grip means to said normal position.

14. The subject matter of claim 13 wherein initial evacuation of said suction grip means and subsequent relative retraction of said suction grip means from said normal position to said limiting position and subsequent extension to said normal position constitutes one operating cycle; selectively operable means for initiating each said operating cycle; and means for effecting retention of said suction grip means in said normal position following each operating cycle until said selectively operable means is released and subsequently reoperated.

15. The subject matter of claim 13 wherein initial evacuation of said suction grip means and subsequent relative retraction of said suction grip means from said normal position to said limiting position and subsequent extension to said normal position constitutes one operating cycle; selectively operable means for initiating each said operating cycle; and means for maintaining said suction grip evacuating means operative to retain said suction grip means evacuated until release of said selectively operable means at the termination of each said operating cycle.

16. A work holding device for securing a tool to a workpiece, comprising: a body; suction grip means having an evacuation chamber therein and an open side communicating therewith and sealingly engageable with the surface of the workpiece; carriage means supporting said suction grip means on said body for retractile and extensible movement relative to the latter; means for evacuating said chamber of said suction grip means to cause adherence of the latter to the workpiece; fluid operated power means in said body for retracting and extending said carriage means relative to said body; means for supplying operating fluid to said fluid operated power means; and vacuum operated valve means responsive to the vacuum in said chamber of said suction grip means for controlling fluid flow to said fluid operated power means; said valve means being operative to cut off fluid flow to said fluid operated power means until the pressure in said chamber of said suction grip means drops to a predetermined value.

17. The subject matter of claim 16 wherein said valve means comprises a diaphragm actuated valve having atmospheric pressure acting on one side of its diaphragm, and means communicating the other side of said diaphragm to the chamber of said suction grip means.

18. A work holding device for securing a tool to a workpiece, comprising: a body; suction grip means having an evacuation chamber therein and an open side communicating therewith and sealingly engageable with the surface of the workpiece; carriage means supporting said suction grip means on said body for movement relative to the latter including a piston connected to said suction grip means and movable in a cylinder in said body; means for evacuating said chamber of said suction grip means to cause adherence of the latter to the workpiece; means including valve means for selectively supplying operating fluid to and venting one end of said cylinder, said valve means being movable to a normal first position for supplying fluid to said one end of said cylinder to effect movement of said piston in one direction in the cylinder, and to a second position for venting said one end of the cylinder to condition said cylinder for movement of said piston in the opposite direction; means for normally retaining said valve means in said first position; and means responsive to predetermined vacuum in said chamber of said suction grip means for causing movement of said valve means to said second position and supplying operating fluid to the other end of said cylinder to cause movement of said piston in said opposite direction.

19. The subject matter of claim 18 wherein said valve means comprises fluid operated valve means; and said pressure responsive means comprises means for supplying operating fluid to said valve means to move the latter to said second position, and valve means responsive to the pressure in said suction grip means for controlling the flow of operating fluid to said fluid operated valve means and said other end of the cylinder.

20. A work holding device for securing a fluid operated tool to a workpiece, comprising: hollow suction grip work holding means having an open side sealingly engageable with the surface of the workpiece; means for evacuating the hollow of said suction grip means to cause adherence of the latter to the workpiece; a fluid flow system for supplying operating fluid to a fluid operated tool associated with the work holding device; and means responsive to the pressure in the hollow of said suction grip means for controlling fluid flow in said system.

21. The subject matter of claim 20 wherein said means responsive to the pressure in said suction grip means comprises normally closed valve means which are opened to permit flow of fluid in said system in response to a predetermined vacuum in said hollow of said suction grip means.

22. The subject matter of claim 21 wherein said valve means comprises a first fluid operated valve for controlling fluid flow in said system, means for supplying operating fluid to said first valve, and a second valve responsive to the vacuum in said suction grip means for controlling the flow of operating fluid to said first valve.

23. A work holder for a tool, comprising: a body, extensible and retractile carriage means on said body, a frame secured to the end of said carriage means, spaced work engaging members on said frame, suction grip means fixed to said frame and engageable with the surface of a workpiece, and means for evacuating said suction grip means to cause pressing of said members against the work surface and rigid retention of said body in fixed angular relationship with respect to the surface.

24. A work holder, comprising: a suction grip having open forward sides and including a rear flexible wall remote from said open side, a multiplicity of intersecting substantially parallel lips extending in each of two directions across said flexible wall and joined to and extending forwardly from said wall and defining a plurality of separate open-sided cells open at said forward side of said suction grip, said suction grip having wall means rearwardly of and peripherally sealed to said flexible wall and including a rigid wall spaced slightly from and parallel to said flexible wall to define a first narrow space therebetween, said wall means defining a second space rearwardly of said rigid wall, one of said rigid and flexible walls having a plurality of intersecting beads substantially aligned with said lips and engaging the opposing surface of the other of the latter walls for normally maintaining a spacing therebetween and for defining a plurality of separate inner cells opposite said open-sided cells, said flexible wall having a plurality of restricted openings therethrough forming communication between alternate open-sided cells and inner cells opposite thereto in both directions across said flexible wall, said rigid wall having, within the confines of said opposite inner cells, a plurality of openings misaligned with respect to and of larger area than said restricted openings and each communicating one of said inner cells with said second space, and evacuating means for exhausting said second space and thereby said alternate open-sided cells through said openings, a predetermined rate of air flow through any one of said restricted openings from the adjacent open-sided cell to said first space causing flexing of the flexible wall about said one opening into contact with said rigid wall to seal off said adjacent open-sided cell.

References Cited in the file of this patent

UNITED STATES PATENTS

| | | |
|---|---|---|
| 633,882 | Moissenet | Sept. 26, 1899 |
| 1,729,131 | Shaff | Sept. 24, 1929 |
| 2,710,234 | Hansen | June 7, 1955 |